Aug. 11, 1959    H. E. KIESLING    2,898,783
APPARATUS FOR DRILLING RADIAL HOLES
Filed Sept. 25, 1956    3 Sheets-Sheet 3

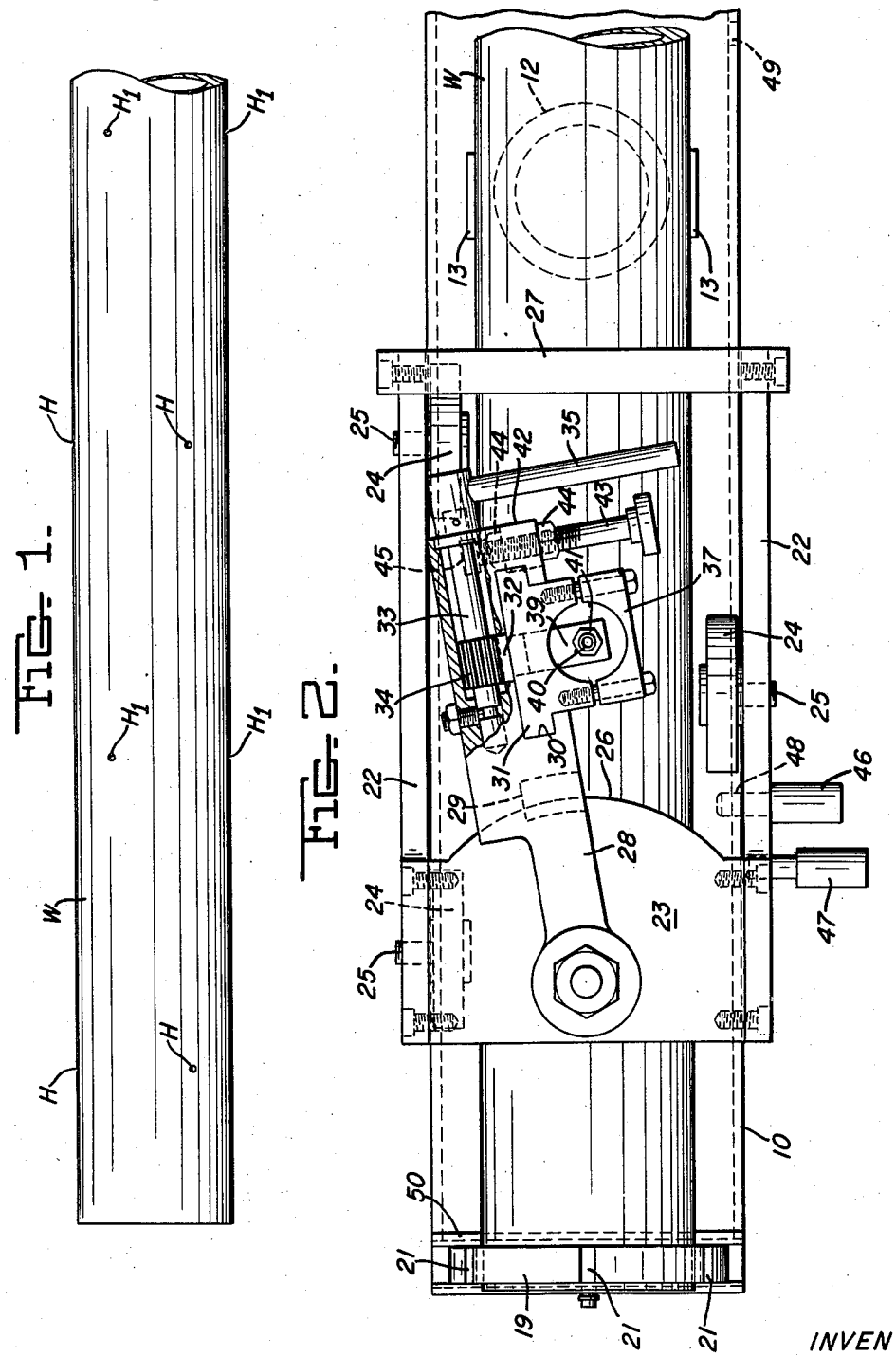

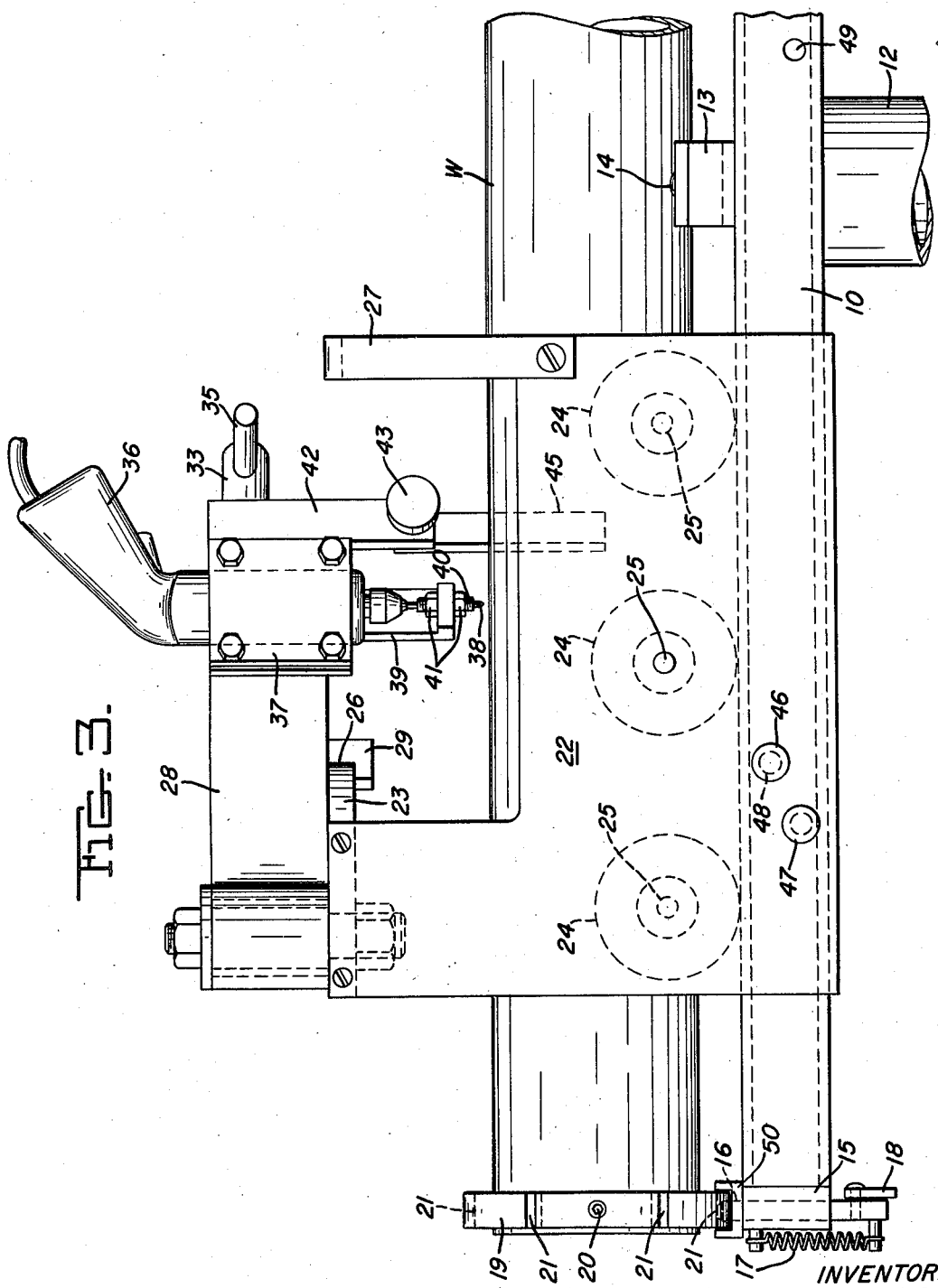

INVENTOR:
HARRY E. KIESLING,
BY: Donald G. Dalton
his Attorney.

2,898,783

APPARATUS FOR DRILLING RADIAL HOLES

Harry E. Kiesling, Ellwood City, Pa., assignor to United States Steel Corporation, a corporation of New Jersey Application September 25, 1956, Serial No. 611,994

10 Claims. (Cl. 77—27)

This invention relates to an improved fixture for drilling radial openings in cylindrical workpieces according to a predetermined pattern.

My fixture is especially suited for drilling "tell-tale" holes in still tubes used in petroleum refineries. These holes are drilled in definite patterns along the length of the tube, for example three holes 120° apart in common transverse planes uniformly spaced longitudinally with the holes in successive planes offset 60°. The holes do not penetrate the full wall thickness, but when internal corrosion weakens a tube, the holes permit a small visible leakage. Thus a defective tube can be spotted and replaced before serious damage occurs, such as failure of a large section with consequent danger of fire and explosion. Prior to my invention laying out and drilling these holes in the proper pattern has been a slow and tedious task since the tubes are usually 40 to 60 feet long and not perfectly straight. Nevertheless it is apparent that my invention is not limited to drilling holes for this purpose, but its principles have application wherever it is desired to drill radial holes in a particular pattern in a cylindrical piece.

An object of my invention is to provide an improved fixture which facilitate accurately locating and drilling radial holes in a long length cylindrical piece according to a predetermined pattern despite irregularities in straightness of the piece.

A more specific object is to provide an improved fixture for clamping a long-length cylindrical piece for rotational adjustment, and including a longitudinally movable drill supporting carriage for positioning a drill over the center line of the piece at any location along the length of the piece despite irregularities, thus enabling radial holes to be drilled in the piece at any desired location and according to a predetermined pattern.

In accomplishing these and other objects of the invention, I have provided improved details of structure, a preferred form of which is shown in the accompanying drawings, in which:

Figure 1 is a side elevational view of a tube drilled in accordance with one pattern which can be attained with the embodiment of my fixture illustrated;

Figure 2 is a top plan view of my fixture partly in section and with the drill omitted to afford a clearer showing;

Figure 3 is a side elevational view of the fixture; and

Figure 4:
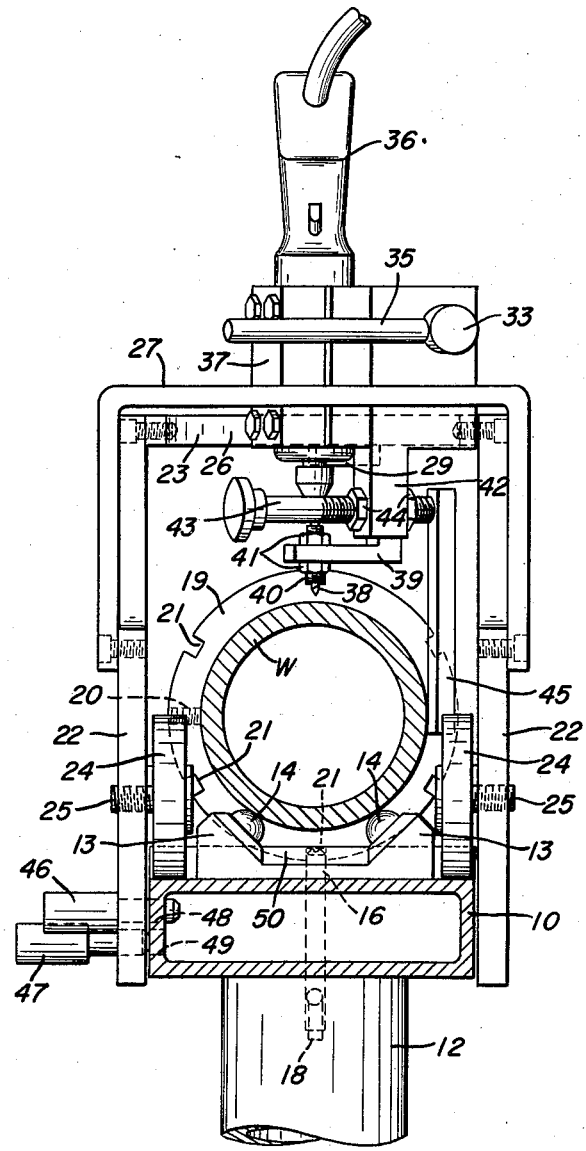
Figure 4 is an end elevational view partly in section.

Figure 1 illustrates a typical drilling pattern which my fixture can attain. The figure shows a still tube W of considerable length (for example 60 feet) and having slight irregularities in its straightness. The tube has a first series of tell-tale holes H which are spaced 120° apart and lie in common transverse planes, and a second series $H_1$ intermediate the first and offset 60°.

As shown in Figures 2, 3 and 4, my fixture includes a supporting table 10 of hollow rectangular cross section and extended length mounted on legs 12. The table carries a plurality of upstanding lugs 13 which are spaced inwardly from the side edges and support ball transfers 14. Workpiece W is supported on said ball transfers, which enable it freely to be rotated or moved lengthwise unless latched in position. A housing 15 is fixed to one end of table 10 and carries latch means, which includes a vertically movable plunger 16 and a tension spring 17 connected between the table and the lower end of the plunger and normally urging the plunger upwardly. The plunger 16 carries a pivoted detent 18 which normally extends downwardly but can be turned to a raised position where it bears against the underside of table 10 and thus holds the plunger down against the action of spring 17. An index ring 19 of a size to receive the workpiece with a close sliding fit is removably fixed to the end thereof, as with set screws 20. The outer circumference of this ring contains a plurality of spaced notches 21, any one of which can receive the upper end of the plunger 16 to hold workpiece W against rotation. In the example of a fixture for drilling tell-tale holes, the notches are 60° apart and for convenience can be painted two alternating colors, for example red and yellow. As hereinafter explained, the red notches locate the workpiece for drilling holes H in one series of transverse planes and the yellow the holes $H_1$ in the alternating planes. The upper face of the housing 15 carries a transverse channel 50 which receives the lower portion of the index ring 19 to hold the workpiece against longitudinal movement.

A removable carriage, which is formed of a pair of L-shaped sidepieces 22 and a toppiece 23 rigidly bolted together, straddles the table 10 and workpiece W. The carriage is supported on wheels 24 which are journaled on stub shafts 25 extending inwardly from the sidepieces 22 and ride on the upper face of the table outside the ball transfers 14 and their supporting lugs. Preferably there are three of these wheels, two on one side and one on the other, to enable the carriage more readily to follow irregularities in the workpiece. The toppiece 23 covers only the vertical legs of the L-shaped sidepieces and has an arcuate front edge 26. The remainder of the carriage is open at the top. Preferably a handle 27 is fixed to the front of the carriage. An arm 28 is pivoted to the toppiece on a vertical axis at the center about which the arcuate edge 26 is constructed. The underface of said arm carries a depending guidepiece 29 which overhangs the arcuate edge to prevent pressure of the drill from moving the arm upwardly.

One face of the arm 28 contains a vertical slot 30 of T-shape in cross section in which a slide 31 is mounted for vertical movement. The inner face of said slide carries a gear rack 32. A longitudinal shaft 33 is journaled in the arm 28 and carries a pinion 34 which meshes with said rack. The outer end of the shaft carries an operating lever 35 for rotating the shaft and thus raising or lowering the slide. A conventional power-operated drill 36 is mounted on the slide, being held by a clamping piece 37. The drill has a bit 38. A depending L-shaped stop 39 is fixed to the slide and carries a vertically extending hollow stud 40 through which the drill bit extends. A pair of nuts 41 adjustably position the stud 40 in relation to the stop 39. The stop and its stud control the depth to which the drill bit can penetrate the workpiece.

The arm 28 also carries a depending bar 42 in which a spindle 43 is slidably engaged. Positioning nuts 44 are engaged with said spindle on opposite sides of the bar. A depending positioning bar 45 is attached to the end of the spindle and is adapted to engage the side of the workpiece W substantially opposite the point of drilling. The spindle 43 is adjusted in accordance with the diameter of the workpiece to a position such that the drill bit is directly over the center line of the workpiece whenever the positioning bar contacts the side thereof. This relation is maintained regardless of irregularities in the straightness of the workpiece, since the center line always is determined from the wall adjacent the plane of drilling.

One sidepiece 22 of the carriage has a pair of index pins 46 and 47 conveniently marked in the same colors as the notches 21. The edge of the table top 10 has two series of sockets 48 and 49 for receiving the respective pins 46 and 47. These sockets likewise are conveniently marked with the same colors. In the example illustrated, the drill 36 is positioned longitudinally to drill holes H when the red pin 46 is within any one of the red sockets 48 and holes $H_1$ when the yellow pin 47 is within any one of the yellow sockets 49.

In operation, workpiece W is placed on the ball transfer 14 with an index ring 19 of the proper diameter installed. The plunger 16 is inserted in one of the red notches 21 of the ring. The spindle 43 is adjusted so that the positioning bar 45 engages the side of the workpiece when the drill bit 38 is over the center line. The carriage is positioned so that the red pin 46 is within the first red socket 48. The arm 28 is swung into drilling position with the positioning bar 45 engaging the side of the workpiece substantially opposite the drilling location and the first hole H is drilled. During drilling, the operator feeds the bit by lowering the operating lever 35. The hole is at proper depth when stud 40 contacts the workpiece. Next the carriage is advanced until pin 46 engages the next socket 48 and another hole drilled, and this procedure is continued the full length of the workpiece. After the last hole in this line has been drilled, the plunger 16 is released from the red notch 21 and the workpiece turned 120° until the plunger engages the next red notch. The procedure is repeated, except that the carriage moves in the opposite direction. After a third line of holes H have been drilled, the workpiece is turned 60° and the plunger engaged with a yellow notch. Yellow pin 47 is engaged with a yellow socket 49 and the procedure repeated for drilling holes $H_1$.

From the foregoing description, it is seen that my invention affords a simple fixture for drilling a large number of holes according to a predetermined pattern. Once the fixture is set up for a particular workpiece and pattern, no further manual measurements are needed. Thus the pattern can be drilled accurately with a minimum of time with the fixture automatically compensating for irregularities in straightness of the workpiece.

While I have shown and described only a single embodiment of my invention, it is apparent that modifications may arise. Therefore, I do not wish to be limited to the disclosure set forth but only by the scope of the appended claims.

I claim:

1. A drilling fixture comprising an elongated support adapted to mount a relatively long length substantially cylindrical workpiece in a fixed position with the long dimension of the workpiece extending in the same direction as the long dimension of the support, the workpiece being subject to having irregularities in its straightness, a carriage mounted on said support and adapted to move longitudinally of the support, an arm pivoted to said carriage, means extending from said arm at a location spaced from the point of pivoting and adapted to engage the exterior of the workpiece substantially opposite the point of drilling and 90° removed therefrom, a drill carried by said arm at a location spaced from the point of pivoting and lying over the center line of the workpiece for drilling a radial hole therein when said extending means engages the exterior regardless of irregularities in straightness of the workpiece, and means carried by said arm for feeding the drill into the workpiece.

2. A fixture as defined in claim 1 including an index ring adapted to be fixed to the workpiece and latch means on said support engageable with said ring for holding the workpiece against rotation.

3. A fixture as defined in claim 2 in which said ring has a plurality of notches spaced around its circumference, any one of said notches being adapted to receive said latch means for positioning the workpiece for drilling in different locations circumferentially thereof.

4. A fixture as defined in claim 1 in which said extending means includes a positioning bar and means adjustably mounting said bar on said arm to change its position to fit workpieces of different diameters.

5. A fixture as defined in claim 1 in which said carriage has two wheels at one side thereof and only one wheel at the other side thereof, said wheels riding on said support.

6. A fixture as defined in claim 1 including an index pin on said carriage, said support having a plurality of sockets spaced along its length, any one of said sockets being adapted to receive said pin for positioning said carriage for drilling in different locations lengthwise of the workpiece.

7. A drilling fixture comprising an elongated support, a plurality of ball transfers on said support adapted to mount a relatively long length substantially cylindrical workpiece with the long dimension of the workpiece extending in the same direction as the long dimension of the support, the workpiece being subject to having irregularities in its straightness, an index ring adapted to be fixed to the workpiece, latch means on said support engageable with said ring at any one of a plurality of locations spaced around the circumference of the ring for holding the workpiece against rotation, a carriage mounted on said support and adapted to move longitudinally of the support, an arm pivoted to said carriage, a positioning bar depending from said arm at a location spaced from the point of pivoting and adapted to engage the exterior of the workpiece opposite the point of drilling and 90° removed therefrom, a slide mounted on said arm at a location spaced from the point of pivoting and being movable toward and away from the workpiece, a drill mounted on said slide and having a bit lying over the center line of the workpiece for drilling a radial hole therein when said bar engages the exterior regardless of irregularities in the straightness of the workpiece, and means carried by said arm for moving said slide and thus feeding the drill bit into the workpiece.

8. A fixture as defined in claim 7 including a stop depending from said arm and through which said drill bit extends, said stop being engageable with the workpiece to limit the depth of penetration of said drill bit into the workpiece.

9. A drilling fixture comprising an elongated support, a carriage mounted on said support and adapted to move longitudinally thereof, an arm pivoted to said carriage on a substantially vertical axis and overlying said support, a positioning bar depending from said arm at a location spaced from the point of pivoting, a drill carried by said arm at a location spaced from the point of pivoting and offset from said bar, and means carried by said arm for feeding said drill toward said support.

10. A drilling fixture comprising an elongated support, an indexing ring mounted for rotating adjustment on said support adjacent one end thereof and being restrained against longitudinal movement, latch means on said support adapted to hold said ring against rotation, a carriage mounted on said support and adapted to move longitudinally thereof, an arm pivoted to said carriage on a substantially vertical axis and overlying said support, a positioning bar depending from said arm at a location spaced from the point of pivoting, a drill carried by said arm at a location spaced from the point of pivoting and offset from said bar, and means for feeding said drill toward said support.

(References on following page)

References Cited in the file of this patent

UNITED STATES PATENTS

| | | |
|---|---|---|
| 1,204,451 | Kaveney | Nov. 14, 1916 |
| 1,247,341 | Skinner | Nov. 20, 1917 |
| 1,453,705 | Crombie | May 1, 1923 |
| 2,392,774 | Schultze | Jan. 8, 1946 |
| 2,437,317 | Davis | Mar. 9, 1948 |